UNITED STATES PATENT OFFICE.

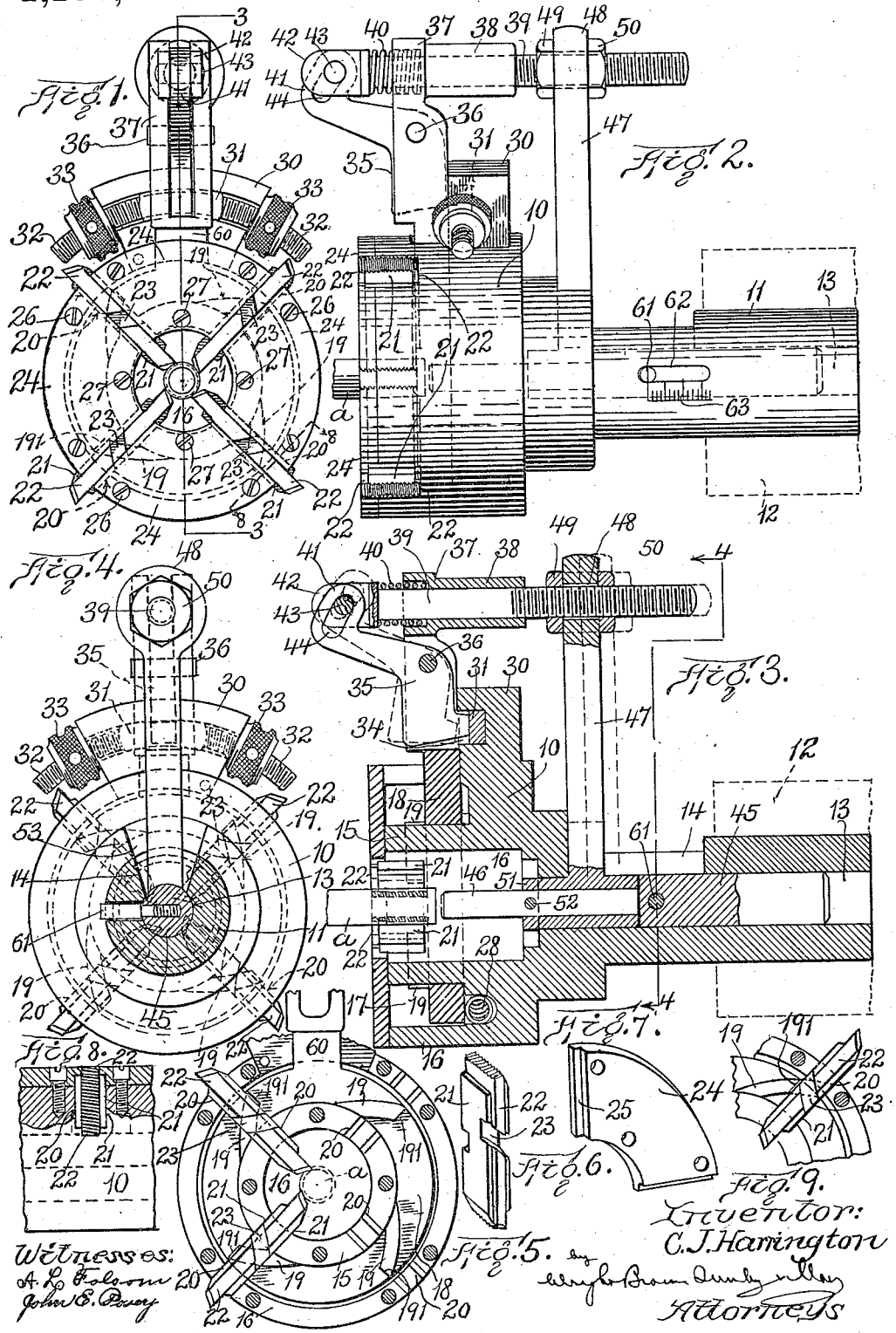

CORNELIUS J. HARRINGTON, OF BOSTON, MASSACHUSETTS, ASSIGNOR TO HARRINGTON MANUFACTURING COMPANY, OF BOSTON, MASSACHUSETTS, A CORPORATION OF MASSACHUSETTS.

SELF-OPENING DIE.

1,154,568. Specification of Letters Patent. Patented Sept. 21, 1915.

Application filed March 7, 1914. Serial No. 823,112.

*To all whom it may concern:*

Be it known that I, CORNELIUS J. HARRINGTON, a citizen of the United States, and a resident of Boston, in the county of Suffolk and State of Massachusetts, have invented certain new and useful Improvements in Self-Opening Dies, of which the following is a specification.

This invention has for its object to provide a quick-opening die which may be used for cutting screw threads, and particularly a die which may be mounted upon a turret or carriage of a screw machine.

On the drawings, Figure 1 represents in front elevation a die embodying the invention. Fig. 2 represents a side elevation of the same. Fig. 3 represents a longitudinal vertical section through the die. Fig. 4 represents a section on the line 4—4 of Fig. 3. Fig. 5 represents a front end elevation of the die with the sectional face plate removed. Fig. 6 shows one of the chasers. Fig. 7 represents one of the sections of the face plate. Fig. 8 shows a section on the line 8—8 of Fig. 1, with the chaser in end elevation. Fig. 9 shows the cam ring in position to permit the removal of the chasers without removing the face plate.

Referring to the drawings, the die body 10 has projecting from its rear face an elongated hub 11 by which it may be secured upon a turret indicated by dotted lines at 12. The hub is centrally apertured as shown at 13, and is provided with a slot 14 the walls of which converge as shown in Fig. 4 for a purpose to be explained. From the front face of the die body, there are two annular flanges 15 and 16, there being within the flange 15 a socket 16 to receive the work. Placed in the annular groove 17 between the two flanges, there is a cam ring 18, having upon its front face cam ribs 19 for engagement with the chasers as will be explained. In the front ends of the flanges 15 and 16, there are formed grooves 20 for the reception of chasers 21. In cross section, said chasers are approximately oblong, and on each side face of the chaser there is a narrow rib 22, the slots 20 being so formed that the bottom of each is formed to receive one of said ribs. Each chaser is provided at each end with cutting edges. Said edges may be formed so that, by reversing the chasers, right-hand or left-hand threads may be cut upon the work, or else threads of different pitch may be cut according to the formation of the cutting edges on the chasers. Each chaser is provided on opposite sides with grooves 23 to receive the cam ribs 19 on the cam ring 18. The chasers are held in place by a front plate which is formed in a plurality of segmental sections, each section being indicated at 24. The ends of the sections are separated and each end is undercut, as indicated at 25, to take over the side of a chaser, as shown in Fig. 8, the faces of the ribs 22 being flush with the exposed surfaces of the sections 24. The cutting edges upon each chaser extends from face to face of the ribs 22 so that the end cutting edge on each chaser is flush with the exposed surface of the section of the face plate. The sections of the face plate are secured to the ends of the flanges 15 and 16 by screws or other fastenings 26, 27 of which there may be as many as needed.

The cam ring is moved to open position by a spring indicated at 28 which bears at one end against an internal projection on the cam ring, and the other end of which bears against a shoulder in the die body. Said spring is arranged in a groove behind the cam ring. I have not deemed it necessary to show the particular arrangement of this spring, it being sufficient merely to state its function.

The die body is formed with a segmental boss 30 having an arcuate groove in which is located a keeper block 31 having curved threaded ends 32 upon which are located nuts 33 bearing against the side faces of the segmental boss. The keeper block 31 has a groove 34 to receive a latch 35 pivoted upon a pin 36 in a projecting arm 37 formed as a part of the cam ring 18. By swinging the cam arm 37 in proper direction, as for instance to the left in Fig. 1, the cutters or chasers are forced radially inwardly toward the work until the latch 35 enters the notch 34 in the keeper block 31, this movement being against the tension of the spring 28. By releasing the latch from the keeper block, the spring 28 will rotate the cam ring in the opposite direction to open the die automatically. I provide automatic means for releasing the latch from the keeper block. To this end, the arm 37 is formed at its end with a hub or bearing 38 for a slide bar 39 which is normally thrust to the left by a spring 40 placed between the head 41 and a shoulder formed on the hub. Preferably the hub is socketed to receive a portion of the spring. The head 41 is provided with parallel ears 42 through which is passed a pin 43, the latter also passing through a slot 44 in the end of the latch 35. This slot is preferably segmental and concentric with the pivot pin 36. The end of the slide bar 39 projects rearwardly from the bearing 38 and is threaded as shown for the purpose to be described.

I have already stated that the die body is provided with a central aperture 13. In this aperture is located a spindle or member 24 which is adapted to slide and to rock therein. This spindle has a forwardly projecting pin 46 extending forwardly into the socket 16 in the center of the die body and in line with the end of the work which is indicated at $a$. Pivoted upon said pin 46 there is an arm 47 which extends outwardly through the slot 14, and the end of which is apertured as at 48 to receive loosely the threaded end of the slide bar 39. Said arm 47 and the spindle 45 are adjustable longitudinally of the slide bar and are secured after adjustment by nuts 49, 50 screwed on said threaded end. The arm 47 is held against longitudinal movement relatively to the pin 46 by a collar 51 secured to the said pin by a cross pin 52. The collar 51 is of the same diameter as the spindle 45 so that it will slide in the aperture 13 in the die body. The tension of the spring 40 is sufficient to hold the arm 47 against the rear face of the die body. In this connection, it will be observed from Figs. 3 and 4 that the rear portion of the die is recessed as at 53, the walls of the recess being respectively in alinement with the converging walls of the groove 14.

In operation, when the chasers have advanced far enough upon the work for the work to engage the pin 46, the continued movement of the die body relatively to the work will cause the spindle 45 to be forced rearwardly until the latch 35 has been disengaged from the keeper block, immediately upon which the spring 28 will rotate the cam ring 18 and open the cutters or move them radially outwardly from the work. As the cam ring rotates, the arm 47 rotates with it until it engages the side wall of the slot 14 or the side wall of the socket 53.

I consider it to be a distinct advantage to have the face plate formed in segmental sections, as it enables me to have the exposed faces of the chasers flush with the plate or even to project therebeyond if desired, as it is possible by this construction to force the chasers up to a shoulder on the work so that the threads formed on the work will terminate at the shoulder. Of course, where the screw threads are formed on a bar of relatively small diameter, this does not make so much difference, but, where the part to be threaded projects from a large body portion, the construction is of great advantage for the reason given.

I have devised provisions by which the chasers may be removed and reversed or replaced without detaching the sectional face plate. By an inspection of Figs. 1 to 9, it will be seen that the cam ribs 19 terminate at their outer portions in extremities or end portions 191 which are radial of the axis of the die body. Hence the cam ring may be rotated far enough to wholly disengage the said ribs from the chasers as shown in Fig. 9. Normally this extreme movement of the cam ring to the left is prevented by a removable pin 60 (see Fig. 5) placed in the path of the arm or handle 37. But by removing the pin, the cam ring may be rotated sufficiently to the left to disengage the cam ribs from the chasers and permit the withdrawal of the latter. The member or spindle 45 is held from rotation by a pin 61 which passes through a slot 62 in the hub 11. A scale 63 is formed or secured on said hub, and an index is formed on the end of the pin, so that the exact location of the end of the pin 46 in the die body may be determined and said pin set to be engaged by the work at the proper point after the dies have traveled along the work.

Having thus explained the nature of my said invention and described a way of making and using the same, although without attempting to set forth all of the forms in which it may be made or all of the modes of its use, what I claim is:

1. A self-opening die comprising a die body having a radially extended segment, chasers mounted in said die body, a cam ring having means for operating the chasers, a spring for rotating said cam ring to open the chasers, a latch carried by the cam ring exteriorly of the die body to lock the cam ring to the segment on said die body, and means for releasing the latch including a member centrally located in the die body to be engaged by the work.

2. A self-opening die comprising a die body having a boss or segment extending from its periphery, chasers mounted in said die body, a cam ring located in a groove on said die body and having means for operating the chasers, a spring for rotating said cam ring to open the chasers, a latch carried by the cam ring exteriorly of the die body to lock the cam ring to said boss or segment on the die body, a movable member arranged in the die body to be engaged by the work, and connections between said member and the latch for releasing the latch.

3. A self-opening die comprising a die body having a boss or segment extending from its periphery, chasers mounted in said die body, a cam ring in the die body having means for operating the chasers and also having a radially extending arm, a spring for rotating said cam ring to open the chasers, a latch carried by the arm of the cam ring exteriorly of the die body to lock the ring to the boss or segment of the die body with the chasers in closed position, a member arranged in the axis of the die body and movable logitudinally, an arm projecting radially from said member and adapted to oscillate thereabout, and a connection between said latch and said arm.

4. A self-opening die, comprising a die body, approximately radial chasers, a cam ring for operating said chasers, a spring for partially rotating said ring to open the chasers, an adjustable keeper on the die body, a latch carried by the cam ring to engage said keeper and hold the chasers in closed position, a longitudinally movable member located in the die body in line with the work, a slide carried by the cam ring exteriorly of the die body for operating said latch, and means rotatable with the cam ring and connecting said slide and said member.

5. A self-opening die, comprising a die body, approximately radial chasers, a cam ring for operating said chasers, a spring for partially rotating said ring to open the chasers, a keeper on the die body, a latch pivoted to the cam ring to engage the keeper and hold the chasers in closed position, a slide movable longitudinally of the die body and mounted on the cam ring exteriorly of said die body, a pin and slot connection between the latch and the slide, and work-operated means for moving said slide to release the latch.

6. A self-opening die, comprising a die body, approximately radial chasers, a cam ring for operating said chasers, a spring for partially rotating said ring to open the chasers, an arm projecting radially from said cam ring, a latch pivoted to said arm and a keeper block on the die body for locking the cam ring to the die body, a slide on the arm parallel to the axis of the die body, a work-engaging member in the die body, and an arm pivoted thereto for moving said slide to release the latch and permit the spring to open the chasers.

7. A self-opening die, comprising a die body, approximately radial chasers, a cam ring for operating said chasers, a spring for partially rotating said ring to open the chasers, an arm projecting radially from said cam ring, a latch pivoted to said arm and a keeper on the die body for locking the cam ring to the die body, a slide on the arm parallel to the axis of the die body, a member in the die body to be engaged by the work, an oscillatory arm secured to said member and projecting radially therefrom, and means for adjustably connecting said arm to said slide.

8. A die comprising a body having substantially radial guideways, reversible chasers in said guideways having ribs on their side faces and grooves in their front and rear faces, a cam ring having cams for engagement with said grooves, and a face plate formed of segmental sections secured to said die body, the ends of said sections overlapping said chasers, with the exposed faces of the said ribs substantially flush with the exposed face of said face plate.

9. A die comprising a body having substantially radial guideways, chasers in said guideways having ribs on their side faces, and a face plate formed of segmental sections secured to said die body, the ends of said sections overlapping said chasers, with the exposed faces of the said ribs substantially flush with the exposed face of said face plate, each of said chasers having cutting edges on both ends, extending to the exposed surface of the ribs on said chaser.

10. A self-opening die comprising a die body, having approximately radial guideways, chasers in said guideways having grooves in their sides, a face plate confining said chasers in said guideways, an oscillatory cam ring mounted within said guideway and having cam ribs for moving said chasers, a spring for moving said cam to open the chasers, said cam ring having a radial arm, and a stop normally located in a socket in the die body in the path of said arm for normally stopping the movement of the cam ring while said ribs are in engagement with the chasers, said ribs terminating at points which permit the disengagement of said ribs from said chasers when said cam ring is rotated beyond its normal limit of movement upon the removal of said stop pin.

In testimony whereof I have affixed my signature, in presence of two witnesses.

CORNELIUS J. HARRINGTON.

Witnesses:
JOHN J. HAGERTY,
JOHN P. MURRAY.